US008099043B2

(12) United States Patent
Hong et al.

(10) Patent No.: US 8,099,043 B2
(45) Date of Patent: Jan. 17, 2012

(54) TRANSMIT CHANNEL IN WIDEBAND HIGH FREQUENCY WIRELESS SYSTEM USING MULTIPLE TRANSMIT ANTENNA, AND METHOD THEREOF

(75) Inventors: Seung Eun Hong, Daejeon (KR); Kyeongpyo Kim, Daejeon (KR); Yong Sun Kim, Suwon-si (KR); Woo Yong Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 431 days.

(21) Appl. No.: 12/464,199

(22) Filed: May 12, 2009

(65) Prior Publication Data

US 2009/0286486 A1 Nov. 19, 2009

(30) Foreign Application Priority Data

May 13, 2008 (KR) .................. 10-2008-0044052
May 21, 2008 (KR) .................. 10-2008-0046999
Feb. 17, 2009 (KR) .................. 10-2009-0012757

(51) Int. Cl.
*H04B 7/185* (2006.01)
(52) U.S. Cl. ......... 455/13.3; 455/12.1; 455/73; 455/500
(58) Field of Classification Search .............. 455/39–48, 455/91–355
See application file for complete search history.

(56) References Cited

U.S. PATENT DOCUMENTS

| 2002/0160737 | A1* | 10/2002 | Crawford | 455/272 |
| 2002/0183013 | A1* | 12/2002 | Auckland et al. | 455/73 |
| 2008/0125108 | A1* | 5/2008 | Kuo et al. | 455/423 |
| 2009/0233646 | A1* | 9/2009 | Cyzs et al. | 455/562.1 |

* cited by examiner

*Primary Examiner* — Lincoln Donovan
*Assistant Examiner* — Brandon s Cole
(74) *Attorney, Agent, or Firm* — Staas & Halsey LLP

(57) ABSTRACT

Disclosed are a transmitting device and receiving device for selecting a transmit channel in a wideband high frequency wireless system using a plurality of transmit antennas, and a method thereof. According to the method of selecting a transmit channel, data is transmitted to the receiving device via a predetermined first antenna, and a first channel probing response message including first channel status information of the first antenna is received, in response to the transmission of the data. A channel probing request message that request channel status information of a second antenna, is transmitted to the receiving device via the second antenna, and a second channel probing response message including the second channel status information of the second antenna is received in response to the channel probing request message.

10 Claims, 9 Drawing Sheets

TRANSMIT CHANNEL IN WIDEBAND HIGH FREQUENCY WIRELESS SYSTEM USING MULTIPLE TRANSMIT ANTENNA, AND METHOD THEREOF

CROSS-REFERENCE TO RELATED APPLICATIONS

This application claims the benefit of Korean Patent Application Nos. 10-2008-0044052, 10-2008-0046999, and 10-2009-0012757 respectively filed on May 13, 2008, May 21, 2008, and Feb. 17, 2009 in the Korean Intellectual Property Office, the disclosures of which are incorporated herein by reference.

BACKGROUND

1. Field

Example embodiments relate to a transmitting device and receiving device for selecting a transmit channel in a wideband high frequency wireless system using a plurality of transmit antenna, and a method thereof.

2. Description of the Related Art

A wideband high frequency wireless system uses a high frequency such as a millimeter wave having a strong straightness, and thus, poor communication may occur due to an obstacle, and serious degradation in a communication quality may occur depending on a degradation in a channel status in a wireless channel environment.

Accordingly, multiple antennas that may provide multiple communication paths and an adaptive modulation and coding scheme (MCS) are used in a recent communication system.

However, to transmit a signal via a plurality of antennas at the same time, the same number of radio frequency (RF) chains as a number of the plurality of antennas are used, thereby causing complex hardware, a high electronic power, and a high cost. Accordingly, since the described configuration is not suitable for a system requiring a low cost and a low electronic power, a system including a plurality of antennas and a signal RF chain to enable a single antenna to be used at a specified time, is required.

That is, when a channel status is good, a relatively higher transmission rate is provided by using a high modulation in which a number of transmission bits per symbol is high and by reducing an amount of additional bit information used for channel coding. When the channel status is poor, a quality of signal transmission is maintained even though a relatively lower transmission rate is provided by using a low modulation in which the number of transmission bits per symbol is low and by increasing the amount of additional bit information used for the channel coding.

As described above, a device including the plurality of antennas and the single RF chain may require a method of selecting a single antenna which may provide an optimal transmit channel.

In a conventional art, an antenna which provides the best signal transmission quality is selected by exchanging a control call between a transmitting device and a receiving device prior to data communication between transmitting/receiving devices, and communication is performed via the selected antenna.

The receiving device compares a quality of a received signal with a predetermined standard value during the data communication, and transmits, to the transmitting device, measured channel status information together with a request for changing the antenna when the quality of the received signal is less than the predetermined standard value.

The transmitting device applies a proper MCS to current channel status information after being informed of the request for changing the antenna together with the channel status information of the current channel by the receiving device. Also, when communication over a certain quality level may not be supported with any MCS parameter due to excessive degradation of the channel status, the current antenna is no longer used and another antenna is selected to be used.

However, the method of selecting a transmit antenna disclosed in the conventional art may select another antenna only after poor communication occurs in the currently used antenna, and a desired quality for a signal may not be guaranteed via the selected antenna.

SUMMARY

Example embodiments may provide a method of transmitting a control signal via other transmit antennas excluding a current antenna in a wideband high frequency wireless system, thereby collecting signal status for each transmit antenna, and thus, may provide a method of selecting an antenna that may provide a highest transmission rate among antennas including the current antenna when a current MCS is not applied in the current antenna due to degradation of a channel status, thereby providing an environment where a highest data transmission rate between a transmitting device and a receiving device is maintained.

According to example embodiments, there may be provided a method of selecting a transmit channel, the method including transmitting data to a receiving device via a first antenna, receiving a first channel probing response message including first channel status information of the first antenna, in response to the transmission of the data, transmitting a channel probing request message that requests second channel status information of a second antenna, to the receiving device via the second antenna in a non-data transmission period while communicating via the first antenna, receiving a second channel probing response message including the second channel status information, in response to the channel probing request message, and performing data transmission to the receiving device via one from the first antenna and the second antenna, based on the first channel probing response message and the second channel probing response message.

In this instance, the method may further include transmitting a third channel probing request message that requests third channel status information of a third antenna, to the receiving device via the third antenna in a non-data transmission period while communicating via the first antenna, and receiving a third channel probing response message including the third channel state information, in response to the third channel probing request message.

Also, the method may further include performing data transmission to the receiving device via one from the first antenna, the second antenna, and the third antenna, based on the first channel probing response message, the second channel probing response message, and the third channel probing response message.

Also, the performing of the data transmission may include calculating a data transmission rate via the first channel and a data transmission rate via the second channel, based on the first channel probing response message and the second channel probing response message, selecting one of the first antenna and the second antenna based on the data transmission rates, and performing the data transmission to the receiving device via the selected antenna.

According to example embodiments, there may be provided a method of selecting a transmit channel, the method including transmitting, to a transmitting device, a first channel probing response message including first channel status information of a first antenna of the transmitting device, receiving a channel probing request message that requests channel status information of a second antenna, from the transmitting device in a non-data transmission period while communicating via the first antenna of the transmitting device, transmitting, to the transmitting device, a second channel probing response message including the second channel status information, in response to the channel probing request message, and performing data reception, from the transmitting device, via an antenna selected from the first antenna and the second antenna, based on the first channel probing response message and the second channel probing response message.

According to example embodiments, there may be provided a transmitting device being capable of selecting a transmit channel, including a transmitting unit to transmit data to a receiving device via a first antenna, and a receiving unit to receive a first channel probing response message including first channel status information of the first antenna, in response to the transmission of the data, wherein the transmitting unit transmits a channel probing request message that requests second channel status information of a second antenna, to the receiving device via the second antenna in a non-data transmission period while communicating via the first antenna of the transmitting device, wherein the receiving unit receives a second channel probing response message including the second channel status information of the second antenna, in response to the channel probing request message, and the transmitting device further including a transmission rate calculating unit to calculate a data transmission rate via the first channel and a data transmission rate via the second channel, based on the first channel probing response message and the second channel probing response message.

In this instance, the transmitting device may further include an antenna selecting unit to select one of the first antenna and the second antenna based on the data transmission rate via the first channel and the data transmission rate via the second channel, wherein the transmitting unit performs data transmission via the selected antenna.

Also, the transmitting unit may transmit, to a receiving device, a channel probing request message that requests third channel status information of a third antenna, in a non-data transmission period while communicating via the first antenna, and the receiving unit may receive a third channel probing response message including the third channel status information of the third antenna, in response to the channel probing request message.

Also, the transmission rate calculating unit may calculate the data transmission rate via the first channel, the data transmission rate via the second channel, and a data transmission rate via a third channel, based on the first channel probing response message, the second channel probing response message, and a third channel probing response message.

Also, the transmitting unit may select one channel from the first channel, the second channel, and the third channel based on the data transmission rate via the first channel, the data transmission rate via the second channel, and the data transmission rate via the third channel, and may perform data transmission via the selected channel.

Additional aspects and/or advantages will be set forth in part in the description which follows and, in part, will be apparent from the description, or may be learned by practice of the embodiments.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
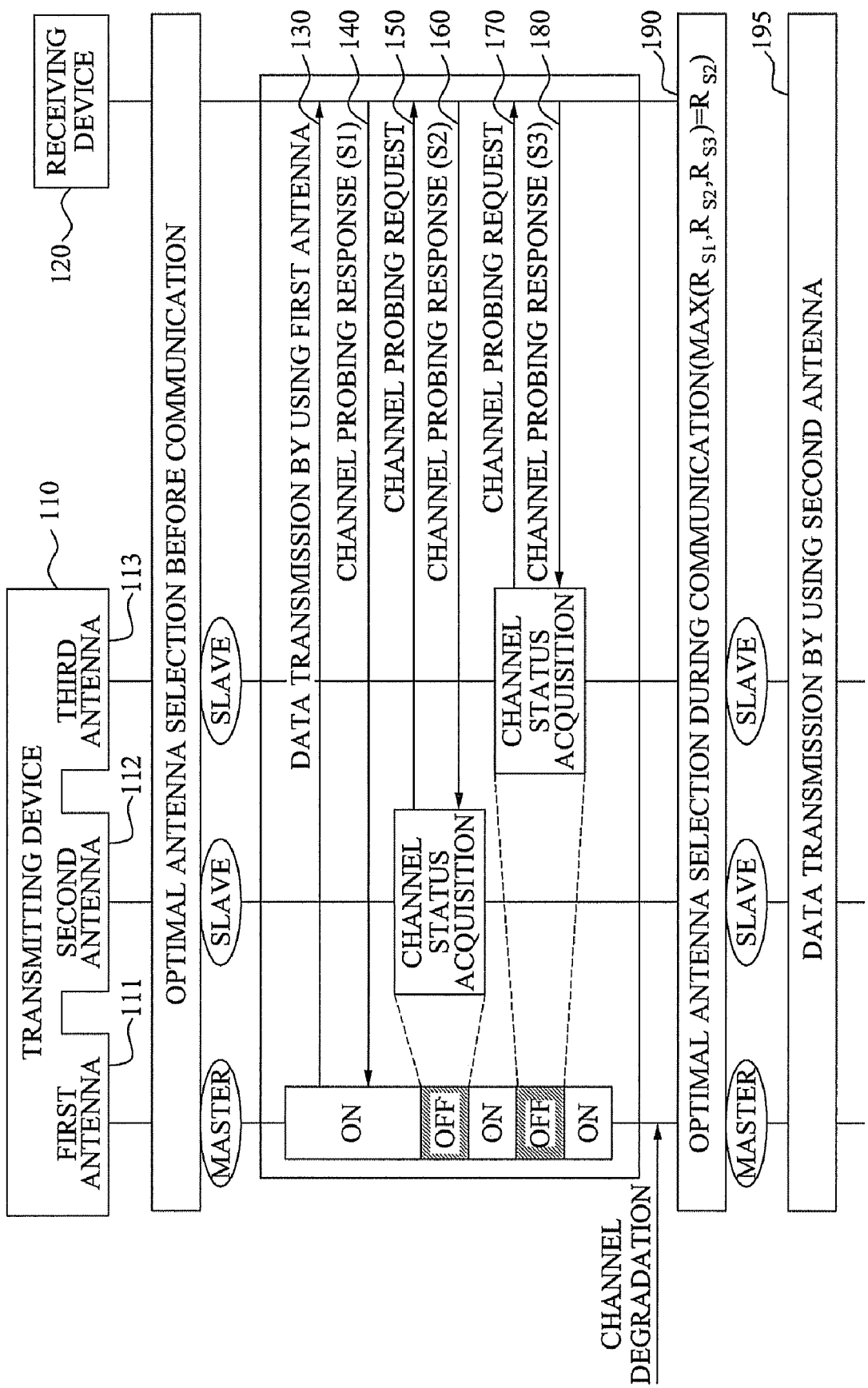
FIG. 1 is a conceptual diagram illustrating a method of selecting a transmit channel in a wideband high frequency wireless system using a plurality of transmit antennas according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 is a conceptual diagram illustrating a method of selecting a transmit channel in a wideband high frequency wireless system using a plurality of transmit antennas according to example embodiments.

FIG. 1 illustrates a transmitting device 110 having three antennas and a receiving device 120 having a single antenna.

The transmitting device 110 selects an optimal antenna among a plurality of antennas 111, 112, and 113 before performing data communication with the receiving device 110. The selected antenna is referred to as a master antenna and the other antennas are referred to as slave antennas.

When a first antenna 111 is the optimal antenna, the first antenna 111 is the master antenna, and the second antenna 112 and the third antenna 113 are slave antennas.

The transmitting device 110 transmits data via the master antenna 111, and collects channel information from the receiving device 120. A characteristic of general data and a characteristic of a wireless system require the data transmission to have a burst characteristic. Accordingly, the transmitting device 110 may not always perform data transmission but may perform the data transmission based on an on/off scheme. Therefore, signal transmission via the master antenna may be based on the on/off scheme.

When data is not transmitted via the master antenna 111, the transmitting device 110 performs transmission 150 of a channel probing request message which is significantly short compared with a data message, via the slave antennas 112 and 113, and collects channel status information S1, S2, and S3, as a channel proving response 160.

The transmission of the slave antenna and collection of channel status information is performed by slave antennas 112 and 113, and accordingly, the transmitting device 110 may recognize channel status through each antenna. This operation may be performed periodically and the transmitting device 100 may retain a most recent channel status for each antenna.

During data transmission 130 via the master antenna of the transmitting device, there may need to be a change of an adaptive modulation and coding scheme (MCS) due to degradation of a channel status of a corresponding antenna.

In this instance, the transmitting device 110 may calculate transmission rates RS1, RS2, and RS3 each of which may be acquired through each antenna, based on each channel status provided via the master antenna 111 and other slave antennas 112 and 113.

In this instance, the data transmission rate RS1 via the master antenna 111 may be acquired by the data transmission 130 via the master antenna 111 and reception 140 of a response thereto.

Also, the transmitting device 110 may time that passes after collecting channel status collection information for each antenna, and may determine information collected within a time that does not affect change of a channel, to be valid, and may set a transmission rate of an antenna of a channel which is determined to be invalid, as "0".

An antenna having a highest transmission rate, max (RS1, RS2, and RS3), is determined as the master antenna by comparing data transmission rates calculated based on the channel status information collected for each antenna. As an example, when the second antenna 112 of FIG. 1 is the master antenna, the first antenna 111 and the third antenna 113 are slave antennas.

When a data transmission rate provided via the master antenna is less than a predetermined value, the operation of selecting an optimum antenna is embodied to be periodically performed. An antenna providing the highest data transmission rate may be selected as the master antenna through the periodic selection of the optimum antenna.

Figure 2:
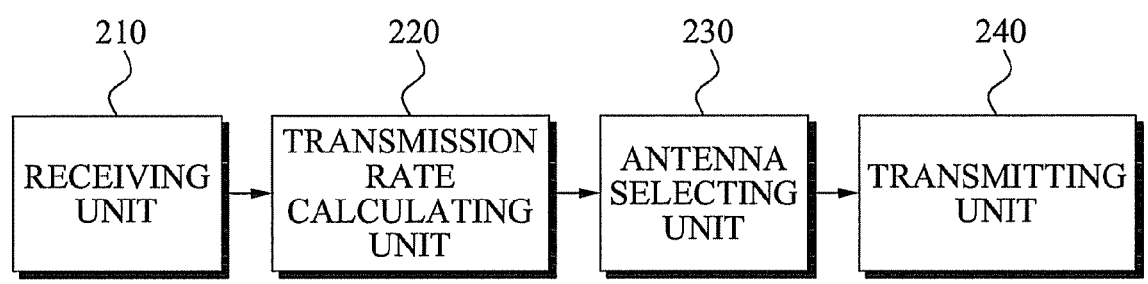
FIG. 2 is a diagram illustrating a configuration of a transmitting device having a plurality of transmit antennas of a wideband high frequency wireless system according to example embodiments.

FIG. 2 is a diagram illustrating a configuration of a transmitting device having a plurality of transmit antennas of a wideband high frequency wireless system according to example embodiments.

As illustrated in FIG. 2, the transmitting device having the plurality of transmit antennas of a wideband high frequency wireless system according to example embodiments includes a receiving unit 210, a transmission rate calculating unit 220, an antenna selecting unit 230, and a transmitting unit 240.

The transmitting unit 240 transmits data to a receiving device via a predetermined first antenna.

The receiving unit 210 receives a first channel probing response message including first channel status information of the first antenna, in response to the transmission of the data.

Also, the transmitting unit 240 transmits a channel probing request message that requests second channel status information of a second antenna, to the receiving device via the second antenna in a non-data transmission period while communicating via the first antenna.

The receiving unit 210 receives a second channel probing response message including the second channel status information of the second antenna, in response to the channel probing request message.

The transmission rate calculating unit calculates a data transmission rate via the first channel and a data transmission rate via the second channel, based on the first channel probing response message and the second channel probing response message.

The antenna selecting unit 230 may select one of the first antenna and the second antenna based on the data transmission rate via the first channel and the data transmission rate via the second channel.

In this instance, the transmitting unit 240 may perform data transmission via the selected antenna.

Also, the transmitting unit 240 may transmit a channel probing request message that requests third channel status information of a third antenna, to a receiving device via the third antenna in a non-data transmission period while communicating via the first antenna, and the receiving unit 210 may receive a third channel probing response message including the third channel status information of the third antenna.

In this instance, the transmission rate calculating unit 220 may calculate the data transmission rate via the first channel, the data transmission rate via the second channel, a data transmission rate via the third channel, based on the first channel probing response message, the second channel probing response message, and the third channel probing response message. Accordingly, the transmitting unit 240 may select one channel from among the first channel, the second channel, and the third channel based on the data transmission rate via the first channel, the data transmission rate via the second channel, and the data transmission rate via the third channel, and may perform data transmission via the selected channel.

Figure 3:
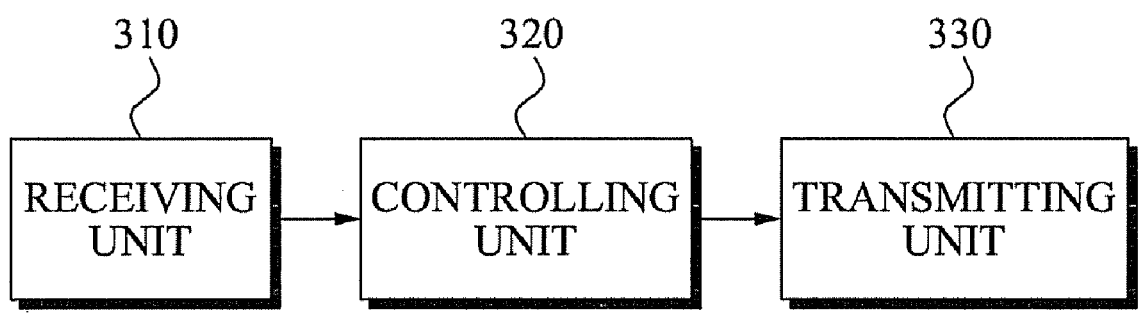
FIG. 3 is a diagram illustrating a configuration of a receiving device of a wideband high frequency wireless system according to example embodiments.

FIG. 3 is a diagram illustrating a configuration of a receiving device of a wideband high frequency wireless system according to example embodiments. The receiving device of the wideband high frequency wireless system according to example embodiments will be described with reference to FIG. 3.

As illustrated in FIG. 3, the receiving device of the wideband high frequency wireless system includes a receiving unit 310, a controlling unit 320, and a transmitting unit 330.

The receiving unit 310 receives data transmitted via a first antenna.

The controlling unit 320 controls to receive a first channel probing response message including first channel status information of the first antenna, in response to the reception of the data, and the transmitting unit 330 transmits the first channel probing response message.

According to example embodiments, the receiving unit 310 receives a channel probing request message that requests second channel status information of a second antenna in a non-data transmission period while communicating via the first antenna.

Also, the controlling unit 320 controls to receive a second channel probing response message including second channel status information of the second antenna, in response to the reception of the channel probing request message, and the transmitting unit 330 transmits the second channel probing response message.

Accordingly, the receiving unit 310 may perform data reception via the one antenna selected from the first antenna and the second antenna, based on the first channel probing response message and the second channel probing response message.

Figure 4:
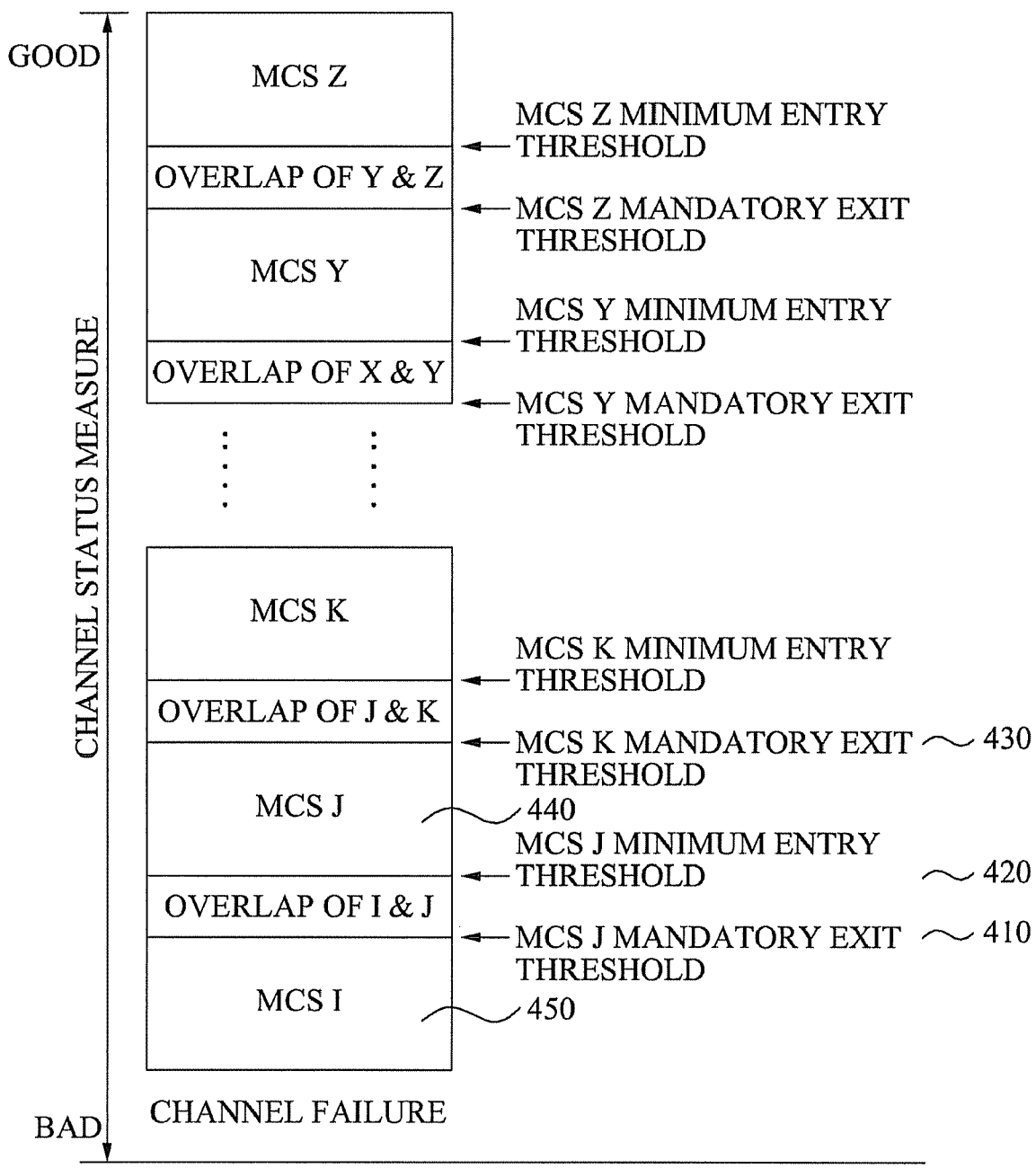
FIG. 4 is a diagram illustrating a method of determining an MCS according to example embodiments.

FIG. 4 is a diagram illustrating a method of determining an MCS according to example embodiments.

As illustrated in FIG. 4, an MCS provided by a system are MCS I through MCS Z, and when a channel status becomes better, the MCS is changed into the MCS Z from the MCS I 450.

In this instance, generally, channel information may be a SNR (dB) value, but the channel information may not be always set as the SNR (dB) value and may use a value that is able to evaluate the channel status.

When channel status information collected via a specified antenna of a transmitting device is greater than an MCS J minimum entry threshold 420 and less than or equal to an MCS K minimum entry threshold 430, an MCS J 440 is determined to be used for transmitting a signal via the corresponding antenna.

When the channel status information determined as the MCS J 440 is greater than an MCS J mandatory exit threshold 410 and less than or equal to an MCS K minimum entry threshold 430, the MCS J 440 is determined to be used for transmitting a signal via a corresponding antenna channel.

When the channel status information is less than an MCS J mandatory exit threshold 410, the corresponding antenna channel may be determined to use MCS I 450.

Figure 5:
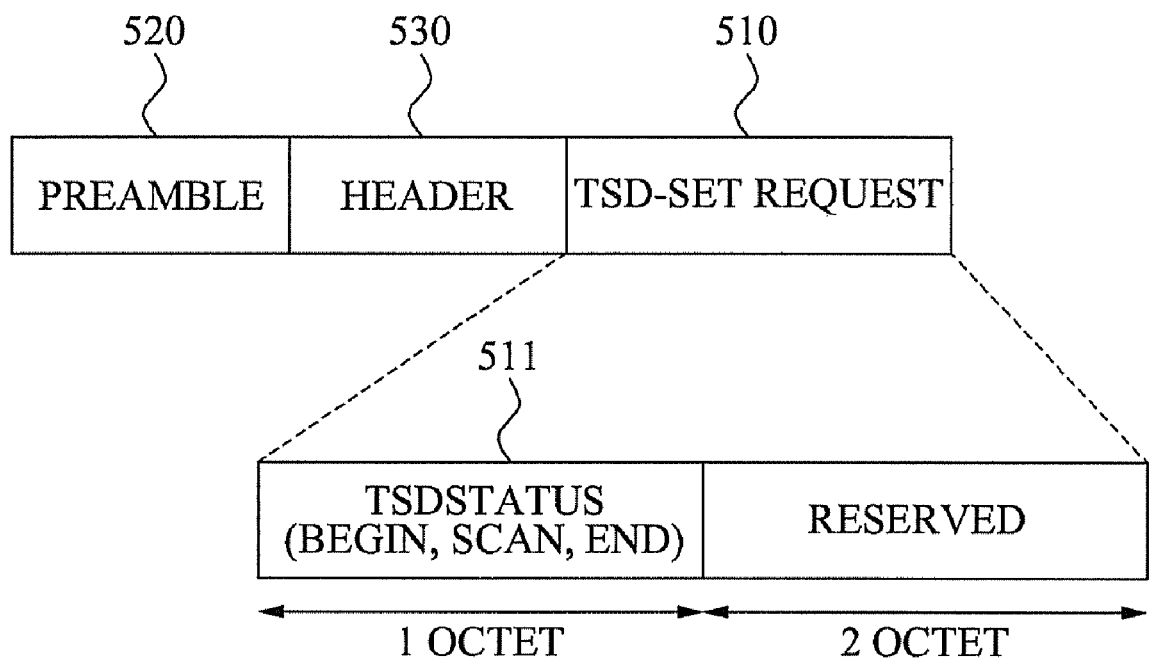
FIG. 5 is a diagram illustrating a channel probing request message according to example embodiments.
Figure 6:
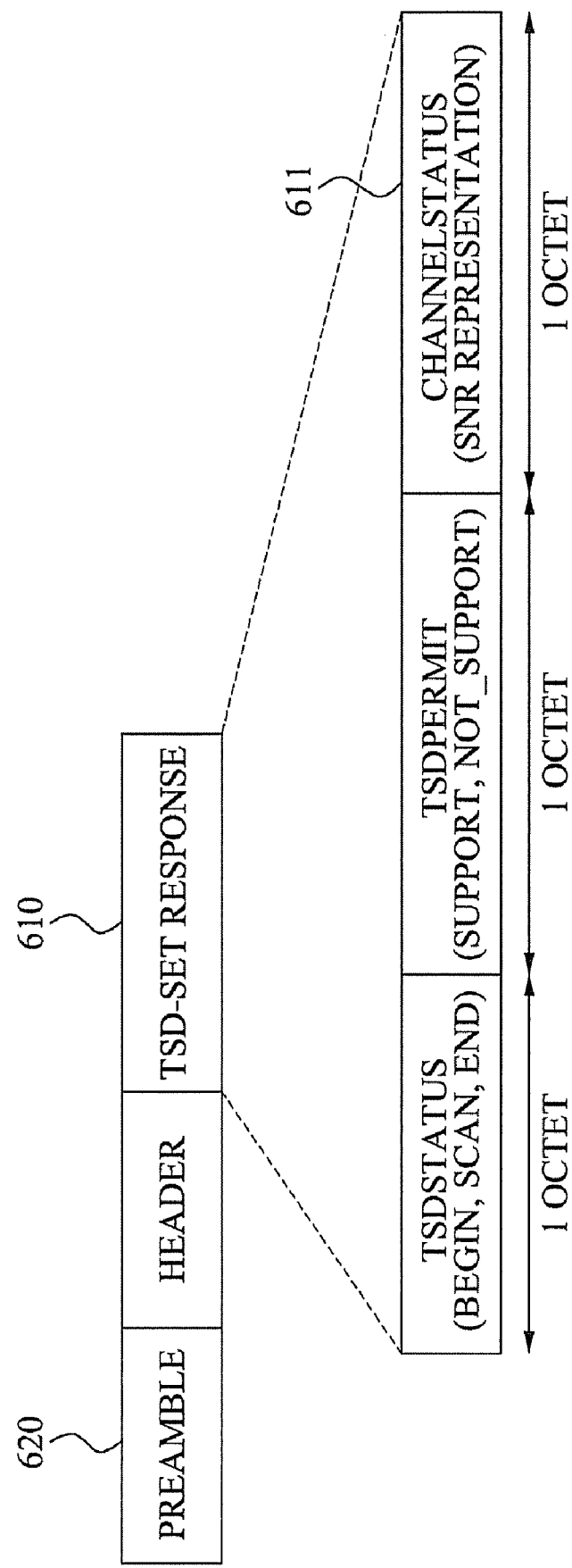
FIG. 6 is a diagram illustrating a channel probing request response according to example embodiments.

FIG. 5 is a diagram illustrating a channel probing request message according to example embodiments, and FIG. 6 is a diagram illustrating a channel probing request response according to example embodiments.

The channel probing request message 510 according to example embodiments, may use a portion of fields of a TSD-Set command message as illustrated in FIG. 5.

The TSD-Set command message is used for determining whether a transmitting device having a plurality of transmit antennas provides an operation of a conventional art to a specified receiving device.

The TSD-Set command message in which a preamble 520 information and header 530 information are encapsulated is transmitted, and SCAN status is added to a TSDStatus field 511 to specify a channel status request. To embody the described configuration, two bits may be used for representing a status, such as 0b00: BEGIN, 0b01: END, 0b10: SCAN, and 0b11: Reserved, and the remaining six bits may not be used, as opposed to a conventional method that uses one bit for representing the status and does not use the remaining seven bits.

The transmitting device may receive a channel probing response message as illustrated in FIG. 6, in response to the channel probing request message (TSD-Set request) that request the channel status.

The channel probing request message 610 may use a Channel Status field 611 of one byte instead of a SupportedAntennaNumber field of two bytes which is not used in the conventional TSD-Set command message, for transferring the channel status information.

Although the ChannelStatus field 611 may be represented based on various values that are able to represent the channel status, according to example embodiments, an SNR of a preamble signal 620 of the TSD-Set request message may be used. The measured SNR value is represented as given eight bits, and values between a suitable minimum value and maximum value are represented by being divided into 255 levels.

Accordingly, the transmitting device sets the TSDStatus field 511 as SCAN and transmits the channel probing request message 510 (TSD-Set request message), to the receiving device via a master antenna or slave antennas, and thus, the receiving device is able to measure a channel status that the channel probing request message 510 (TSD-Set request message) has experienced, and returns the measured channel status to the transmitting device using the channel probing response message 610 (TSD-Set response message).

Figure 7:
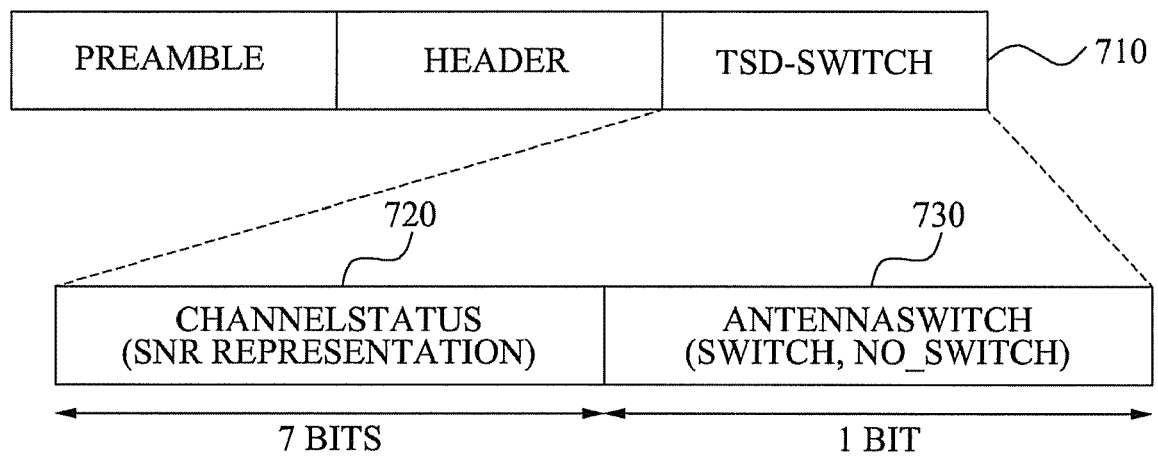
FIG. 7 is a diagram illustrating a channel probing control message according to example embodiments.

FIG. 7 is a diagram illustrating a channel probing control message according to example embodiments.

The channel probing control message illustrated in FIG. 7 is another example for acquiring channel status information provided via a master antenna.

The Channel probing control message 710 (TSD-Switch message) which is defined as an AntennaSwitch field 730 of one bit and a Reserved field 720 of seven bits that is not to be used, configures the non-used seven bits space to contain the channel status information provided via the master antenna.

As opposed to the channel probing request message illustrated in FIG. 5, the channel status field 720 of seven bits measures channel status that data frames have experienced, and represents the measured channel status.

Figure 8:
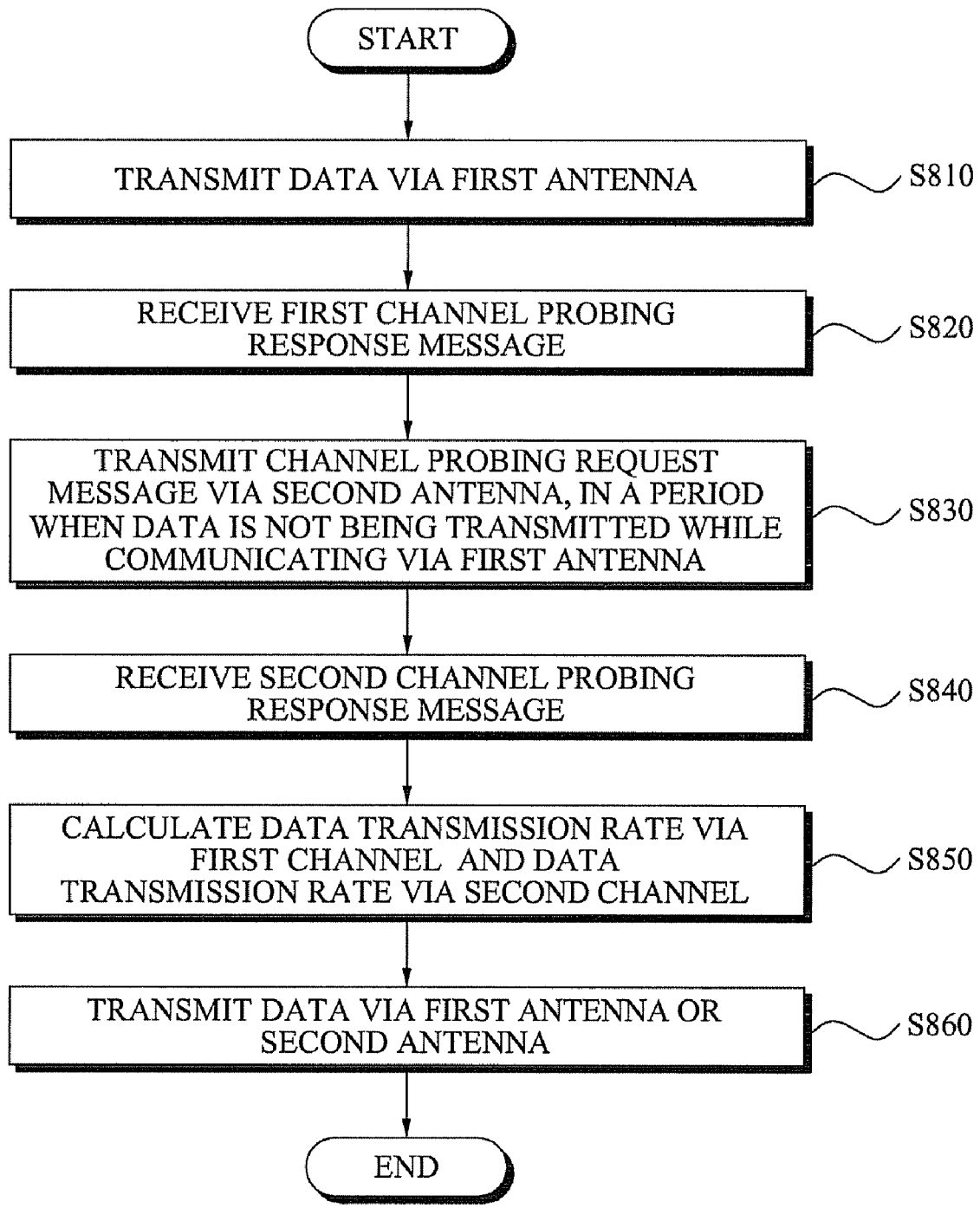
FIG. 8 is a flowchart illustrating a method of controlling a transmitting device having a plurality of transmit antennas of a wideband high frequency wireless system according to example embodiments.

FIG. 8 is a flowchart illustrating a method of controlling a transmitting device having a plurality of transmit antennas of a wideband high frequency wireless system according to example embodiments.

The transmitting unit 810 transmits data to a receiving device via a predetermined first antenna in operation S810.

Subsequently, a receiving unit receives a first channel probing response message including first channel status information of the first antenna, in response to the transmission of the data in operation S820.

Subsequently, the transmitting unit transmits a channel probing request message that requests second channel status information of a second antenna, to the receiving device via the second antenna in a non-data transmission period while communicating via the first antenna in operation S830.

Subsequently, the receiving unit receives a second channel probing response message including the second channel status information of the second antenna, in response to the channel probing request message in operation S840.

Subsequently, a transmission rate calculating unit calculates a data transmission rate via the first channel and a data transmission rate via the second channel based on the first channel probing response message and the second channel probing response message in operation S850.

Subsequently, the transmitting unit performs data transmission via an antenna selected based on the calculated data transmission rate in operation S860.

In this instance, an antenna selecting unit may select one from the first antenna and the second antenna based on the data transmission rate via the first channel and data transmission rate via the second channel, and the transmitting unit may perform the data transmission via the selected antenna.

Figure 9:
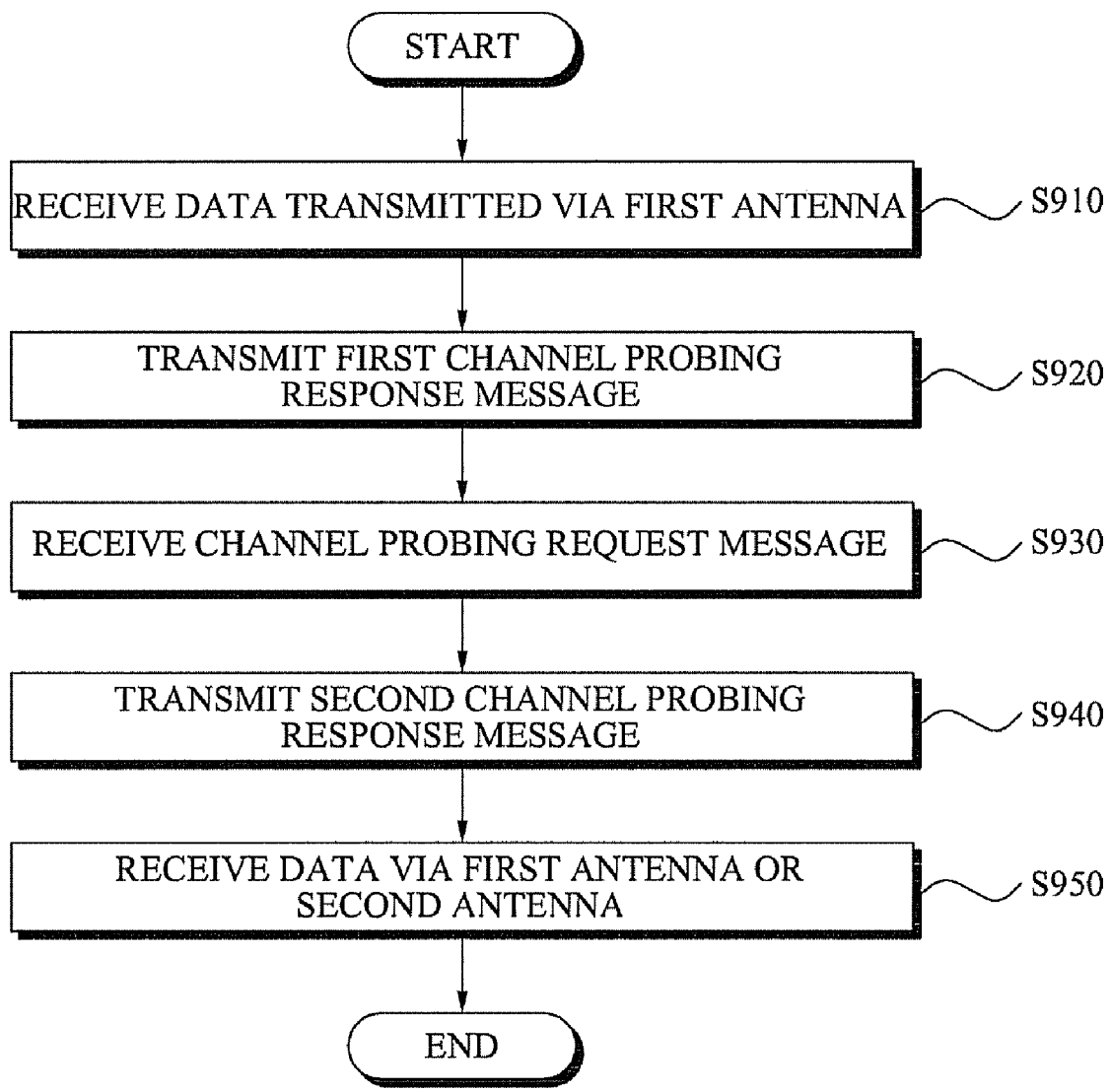
FIG. 9 is a flowchart illustrating a method of controlling a receiving device of a wideband high frequency wireless system.

FIG. 9 is a flowchart illustrating a method of controlling a receiving device of a wideband high frequency wireless system.

A receiving unit receives data transmitted via a predetermined first antenna in operation S910.

A controlling unit controls to transmit a first channel probing response message including first channel status information of the first antenna, in response to the reception of the data, and a transmitting device transmits the first channel probing response message in operation S920.

Subsequently, the receiving unit receives a channel probing request message that request second channel status information of a second antenna, in a non-data transmission period while communicating via the first antenna in operation S930.

The controller controls to transmit a second channel probing response message including a second channel status information of the second antenna, in response to the channel probing request message in operation S940.

Subsequently, the receiving unit may perform data reception via one selected from the first antenna and the second antenna, based on the first channel probing response message and the second channel probing response message in operation S950.

According to example embodiments may provide a method of transmitting a control signal via other transmit antennas excluding a current antenna in a wideband high frequency wireless system, thereby collecting signal status for each transmit antenna. Accordingly, there is provided a method of selecting an antenna that may provide a highest transmission rate among antennas including the current antenna when a current MCS is not applied in the current antenna due to degradation of a channel status, thereby providing an environment where maintains a highest data transmission rate between a transmitting device and a receiving device.

Although a few example embodiments have been shown and described, it would be appreciated by those skilled in the art that changes may be made in these example embodiments without departing from the principles and spirit of the invention, the scope of which is defined in the claims and their equivalents.

What is claimed is:

1. A method of selecting a transmit channel, the method comprising:
   transmitting data to a receiving device via a first antenna;
   receiving a first channel probing response message including first channel status information of the first antenna, in response to the transmission of the data;
   transmitting a channel probing request message that requests second channel status information of a second antenna, to the receiving device via the second antenna in a non-data transmission period while communicating via the first antenna;
   receiving a second channel probing response message including the second channel status information, in response to the channel probing request message; and
   performing data transmission to the receiving device via one from the first antenna and the second antenna, based on the first channel probing response message and the second channel probing response message.

2. The method of claim 1, further comprising:
   transmitting a third channel probing request message that requests third channel status information of a third antenna, to the receiving device via the third antenna in a non-data transmission period while communicating via the first antenna;
   receiving a third channel probing response message including the third channel state information, in response to the third channel probing request message.

3. The method of claim 2, further comprising:
   performing data transmission to the receiving device via one of the first antenna, the second antenna, and the third antenna, based on the first channel probing response message, the second channel probing response message, and the third channel probing response message.

4. The method of claim 1, wherein the performing of the data transmission comprises:
   calculating a data transmission rate via the first channel and a data transmission rate via the second channel, based on the first channel probing response message and the second channel probing response message;
   selecting one of the first antenna and the second antenna based on the data transmission rates; and
   performing the data transmission to the receiving device via the selected antenna.

5. A method of selecting a transmit channel, the method comprising:
   transmitting, to a transmitting device, a first channel probing response message including first channel status information of a first antenna of the transmitting device;
   receiving a channel probing request message that requests channel status information of a second antenna, from the transmitting device in a non-data transmission period while communicating via the first antenna of the transmitting device;
   transmitting, to the transmitting device, a second channel probing response message including the second channel status information, in response to the channel probing request message; and
   performing data reception, from the transmitting device, via an antenna selected from the first antenna and the second antenna, based on the first channel probing response message and the second channel probing response message.

6. A transmitting device being capable of selecting a transmit channel, comprising:
   a transmitting unit to transmit data to a receiving device via a first antenna; and
   a receiving unit to receive a first channel probing response message including first channel status information of the first antenna, in response to the transmission of the data,
   wherein the transmitting unit transmits a channel probing request message that requests second channel status information of a second antenna, to the receiving device via the second antenna in a non-data transmission period while communicating via the first antenna of the transmitting device,
   wherein the receiving unit receives a second channel probing response message including the second channel status information of the second antenna, in response to the channel probing request message, and
   the transmitting device further comprising:
   a transmission rate calculating unit to calculate a data transmission rate via the first channel and a data transmission rate via the second channel, based on the first channel probing response message and the second channel probing response message.

7. The transmitting device of claim 6, further comprising:
   an antenna selecting unit to select one of the first antenna and the second antenna based on the data transmission rate via the first channel and the data transmission rate via the second channel,
   wherein the transmitting unit performs data transmission via the selected antenna.

8. The transmitting device of claim 6, wherein:
   the transmitting unit transmits, to a receiving device, a channel probing request message that requests third channel status information of a third antenna, in a non-data transmission period while communicating via the first antenna; and
   the receiving unit receives a third channel probing response message including the third channel status information of the third antenna, in response to the channel probing request message.

9. The transmitting device of claim 8, wherein the transmitting unit selects one channel from the first channel, the second channel, and the third channel based on the data transmission rate via the first channel, the data transmission rate via the second channel, and the data transmission rate via the third channel, and performs data transmission via the selected channel.

10. The transmitting device of claim 6, wherein the transmission rate calculating unit calculates the data transmission rate via the first channel, the data transmission rate via the second channel, and a data transmission rate via a third channel, based on the first channel probing response message, the second channel probing response message, and a third channel probing response message.

* * * * *